US011703688B2

(12) United States Patent
Shin et al.

(10) Patent No.: US 11,703,688 B2
(45) Date of Patent: Jul. 18, 2023

(54) ANAMORPHIC OPTICAL SYSTEM AND DISPLAY APPARATUS INCLUDING THE SAME

(71) Applicants: SAMSUNG ELECTRONICS CO., LTD., Suwon-si (KR); MYONGJI UNIVERSITY INDUSTRY AND ACADEMIA COOPERATION, Yongin-si (KR)

(72) Inventors: Bongsu Shin, Seoul (KR); Woojun Han, Yongin-si (KR); Jaisoon Kim, Yongin-si (KR); Sunil Kim, Seoul (KR); Hongseok Lee, Seoul (KR)

(73) Assignees: SAMSUNG ELECTRONICS CO., LTD., Suwon-si (KR); MYONGJI UNIVERSITY INDUSTRY AND ACADEMIA COOPERATION, Yongin-si (KR)

(*) Notice: Subject to any disclaimer, the term of this patent is extended or adjusted under 35 U.S.C. 154(b) by 24 days.

(21) Appl. No.: 17/038,592

(22) Filed: Sep. 30, 2020

(65) Prior Publication Data

US 2021/0271083 A1 Sep. 2, 2021

(30) Foreign Application Priority Data

Mar. 2, 2020 (KR) .................... 10-2020-0026124

(51) Int. Cl.
*G02B 27/01* (2006.01)
*G02C 7/08* (2006.01)
(52) U.S. Cl.
CPC ......... *G02B 27/0172* (2013.01); *G02C 7/083* (2013.01); *G02B 2027/011* (2013.01);
(Continued)

(58) Field of Classification Search
CPC .............. G02B 27/017; G02B 27/0172; G02B 2027/011; G02B 2027/0174;
(Continued)

(56) References Cited

U.S. PATENT DOCUMENTS 3,940,204 A 2/1976 Withrington
8,068,285 B1 * 11/2011 Flynn ................. G02B 27/0025
359/619
(Continued)

FOREIGN PATENT DOCUMENTS

CN 104007541 A 8/2014
JP 2007-193070 A 8/2007
WO 2019/132442 A1 7/2019

*Primary Examiner* — Vijay Shankar
*Assistant Examiner* — Cory A Almeida
(74) *Attorney, Agent, or Firm* — Sughrue Mion, PLLC

(57) ABSTRACT

An anamorphic optical system and a display apparatus including the same are disclosed. The anamorphic optical system includes an illumination system having astigmatism, and first and second correction lenses that are provided to have tangential power and sagittal power respectively and correct the astigmatism in the illumination system. The first and second correction lenses are provided in which a difference between a distance from the first correction lens to a tangential image formed by the first correction lens and a distance from the second correction lens to a sagittal image formed by the second correction lens corresponds to a distance between the first correction lens and the second correction lenses, and at least one of the first correction lens and the second correction lens has an asymmetric stop to form the tangential image and the sagittal image on the same surface.

20 Claims, 23 Drawing Sheets

(52) U.S. Cl.
CPC ............... *G02B 2027/0174* (2013.01); *G02B 2027/0178* (2013.01)

(58) Field of Classification Search
CPC ................... G02B 2027/0178; G02B 27/01; G02B 27/10; G02B 3/0037; G02B 5/32; G02C 7/083; G02C 7/086
See application file for complete search history.

(56) References Cited

U.S. PATENT DOCUMENTS

| | | |
|---|---|---|
| 2002/0001127 A1 | 1/2002 | Morishima |
| 2013/0222384 A1* | 8/2013 | Futterer ............... H04N 13/344 345/426 |
| 2019/0227285 A1* | 7/2019 | Wang ..................... G02B 13/22 |
| 2021/0020081 A1 | 1/2021 | Shin et al. |
| 2021/0124171 A1 | 4/2021 | Kim et al. |

\* cited by examiner

ANAMORPHIC OPTICAL SYSTEM AND DISPLAY APPARATUS INCLUDING THE SAME

CROSS-REFERENCE TO RELATED APPLICATION

This application is based on and claims priority from Korean Patent Application No. 10-2020-0026124, filed on Mar. 2, 2020, in the Korean Intellectual Property Office, the disclosure of which is incorporated herein in its entirety by reference.

BACKGROUND

1. Field

The inventive concept relates to an anamorphic optical system and a display apparatus including the anamorphic optical system.

2. Description of Related Art

Recently, display apparatuses for implementing virtual reality (VR) have been developed, and an interest in the display apparatuses is increased. A technology that may implement augmented reality (AR) and mixed reality (MR) is also being studied as a next step of VR.

While VR technology relates to providing a fully virtual world, AR technology is a display technology that increases an effect of reality by overlaying a virtual object or information on a real-world environment. VR may be applied only to fields such as games and virtual experiences, but AR has an advantage of being applicable to various real-world environment scenarios. In particular, AR is attracting attention as a next-generation display technology suitable for a ubiquitous environment or an Internet of things (IoT) environment. AR is an example of MR in showing a mixture of the real world and additional information, which may be in virtual world.

Furthermore, a virtual image provided to an observer from a VR system, an AR system, or an MR system is implemented in a glasses type or a head-mounted type, and when an image is transmitted on an off-axis, a countermeasure for overcoming astigmatism is required.

SUMMARY

The inventive concept provides an anamorphic optical system for overcoming astigmatism and a display apparatus including the anamorphic optical system.

Additional aspects will be set forth in part in the description which follows and, in part, will be apparent from the description, or may be learned by practice of the presented embodiments of the disclosure.

According to an aspect of the disclosure, there is provided an anamorphic optical system comprising: an illumination system having astigmatism; and a first correction lens configured to have tangential power; a second correction lens configured to have sagittal power, wherein a difference between a first distance from the first correction lens to a tangential image formed by the first correction lens and a second distance from the second correction lens to a sagittal image formed by the second correction lens corresponds to a third distance between the first correction lens and the second correction lens, and wherein at least one of the first correction lens and the second correction lens has an asymmetric stop to form the tangential image and the sagittal image on the same surface so as to correct the astigmatism in the illumination system.

A first divergence angle of the tangential image formed by the first correction lens and a second divergence angle of the sagittal image formed by the second correction lens may satisfy a same condition.

The first and second correction lenses may include cylindrical lenses orthogonal to each other.

The illumination system may include off-axis light.

According to an aspect of the disclosure, there is provided a display apparatus comprising: an anamorphic optical system which includes an illumination system configured to transmit image light and having astigmatism, the anamorphic optical system further includes a first correction lens configured to have tangential power and a second correction lens configured to have sagittal power; and an off-axis optical coupler to which the image light from the anamorphic optical system is transmitted, wherein a difference between a first distance from the first correction lens to a tangential image formed by the first correction lens and a second distance from the second correction lens to a sagittal image formed by the second correction lens corresponds to a third distance between the first correction lens and the second correction lens, and wherein at least one of the first correction lens and the second correction lens has an asymmetric stop to form the tangential image and the sagittal image on the same surface so as to correct the astigmatism in the illumination system.

A first divergence angle of the tangential image formed by the first correction lens and a second divergence angle of the sagittal image formed by the second correction lens may satisfy a same condition.

The first and second correction lenses may include cylindrical lenses orthogonal to each other.

The illumination system may be provided to transmit the image light on an off-axis.

The illumination system may include: a light source configured to emit light; a spatial light modulator configured to generate an image by using the light; a focusing lens configured to focus the image generated by the spatial light modulator; and a filtering member configured to: block image light of zero-order diffraction for an image generated by a display panel; allow image light of a predetermined diffraction order to pass therethrough and transmit the image light on an off-axis.

The spatial light modulator may include a reflective spatial light modulator is further configured to reflect light to generate an image.

The spatial light modulator may be further configured to generate a hologram image.

The first and second correction lenses may be disposed between the spatial light modulator and the filtering member.

The optical coupler may include a holographic optical element or a transflective mirror.

The optical coupler may include an off-axis holographic optical element.

The display apparatus may be a display apparatus of one of a glasses type, a head-mounted type, a goggles type, or a head-up type.

The display apparatus may be one of a virtual reality (VR) display apparatus, an augmented reality (AR) display apparatus, or a mixed reality (MR) display apparatus.

The display apparatus may be a display apparatus of one of a glasses type, a head-mounted type, a goggles type, or a head-up type.

The display apparatus may be one of a virtual reality (VR) display apparatus, an augmented reality (AR) display apparatus, or a mixed reality (MR) display apparatus.

According to an aspect of the disclosure, there is provided a method of correcting astigmatism in an anamorphic optical system that includes an illumination system having astigmatism, the method comprising: providing a first correction lens having tangential power; providing a second correction lens having sagittal power, wherein a difference between a first distance from the first correction lens to a tangential image formed by the first correction lens and a second distance from the second correction lens to a sagittal image formed by the second correction lens corresponds to a third distance between the first correction lens and the second correction lens, and wherein at least one of the first correction lens and the second correction lens has an asymmetric stop to form the tangential image and the sagittal image on the same surface so as to correct the astigmatism in the illumination system.

A first divergence angle of the tangential image formed by the first correction lens and a second divergence angle of the sagittal image formed by the second correction lens may satisfy a same condition.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
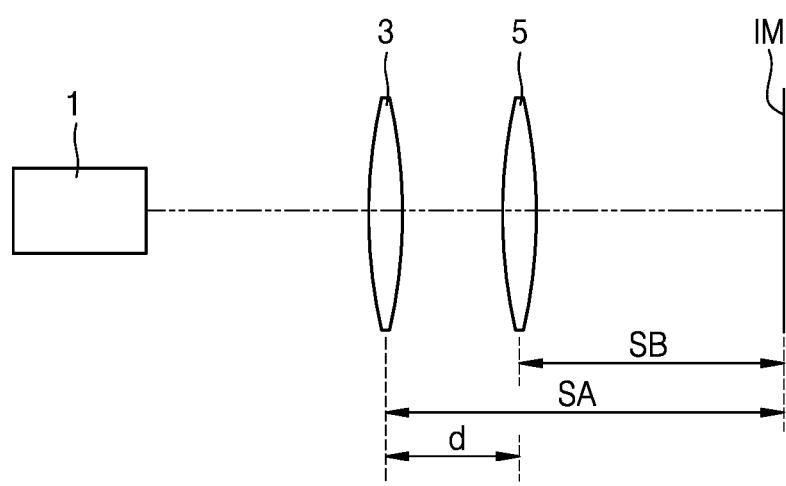
FIG. 1 schematically illustrates an anamorphic optical system according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings. In the drawings, like reference numerals refer to like elements, and a size of each element in the drawings may be exaggerated for clarity and convenience of description. The example embodiments to be described below are merely exemplary, and various modifications are possible from the embodiments.

Hereinafter, what is described as "over" or "on" may include not only directly over and in contact but also over without being in contact. The terms "first", "second", and the like may be used to describe various configuration elements but are only used to distinguish one configuration element from another configuration element. These terms do not limit the materials or structures of the configuration elements. A singular expression includes plural expressions unless the context clearly indicates otherwise. In addition, when a part is described to "include" a certain configuration element, which means that the part may further include other configuration elements, except to exclude other configuration elements unless otherwise stated. A term "above-described" and similar terminology may be used for the singular and the plural.

An anamorphic optical system according to an example embodiment may be applied to overcome astigmatism of a display apparatus in which an image is transmitted on an off-axis, and may be applied to an optical device to compensate for astigmatism even when the astigmatism occurs in a light source itself.

FIG. 1 schematically illustrates an anamorphic optical system according to an example embodiment.

Referring to FIG. 1, the anamorphic optical system according to the example embodiment includes an illumination system 1 with astigmatism, a first correction lens 3 and second correction lens 5. According to an example embodiment, the first and the second correction lenses 3 and 5 have tangential power and sagittal power respectively and correct astigmatism in the illumination system 1. In FIG. 1, IM represents an image surface. Some components of the illumination system 1 may be disposed between the second correction lens 5 and the image surface. Hereinafter, a case where the first correction lens 3 has tangential power, and the second correction lens 5 located between the first correction lens 3 and the image surface IM has sagittal power will be described as an example. According to an example embodiment, the first correction lens 3 may have sagittal power, and the second correction lens 5 may have tangential power.

The illumination system 1 may transmit light to an off-axis optical element or may collimate and transmit light emitted from a semiconductor laser light source, and may include astigmatism. The astigmatism in the illumination system 1 is corrected by arranging the first and second correction lenses 3 and 5, and thus, a tangential image and a sagittal image may be formed on the same image surface IM. Accordingly, the astigmatism in the illumination system 1 may be corrected.

In order to correct the astigmatism, the first and second correction lenses 3 and 5 may be provided so that a difference between a distance from the first correction lens 3 to a tangential image formed by the first correction lens 3 and a distance from the second correction lens 5 to a sagittal image formed by the second correction lens 5 corresponds to a distance between the first correction lens 3 and the second correction lens 5, and at least one of the first correction lens 3 and the second correction lens 5 has an asymmetric stop to form the tangential image and the sagittal image on the same image surface IM.

That is, in FIG. 1, SA is a distance from the first correction lens 3 to the image surface IM, SB is a distance from the second correction lens 5 to the image surface IM, and d is a distance between the first correction lens 3 and the second correction lens 5, for example, SA may correspond to a distance from the first correction lens 3 to a tangential image formed by the first correction lens 3, SB may correspond to a distance from the second correction lens 5 to a sagittal image formed by the second correction lens 5, and SB=SA−d may be satisfied. In addition, a tangential stop position by the first correction lens 3 may be the same as a sagittal stop position by the second correction lens 5. Accordingly, the first and second correction lenses 3 and 5 may form a tangential image and a sagittal image on the same image surface IM to correct astigmatism in the illumination system 1, and because a tangential stop position is the same as a sagittal stop position, light loss in an aperture stop may be reduced and light efficiency may be increased.

Figure 2:
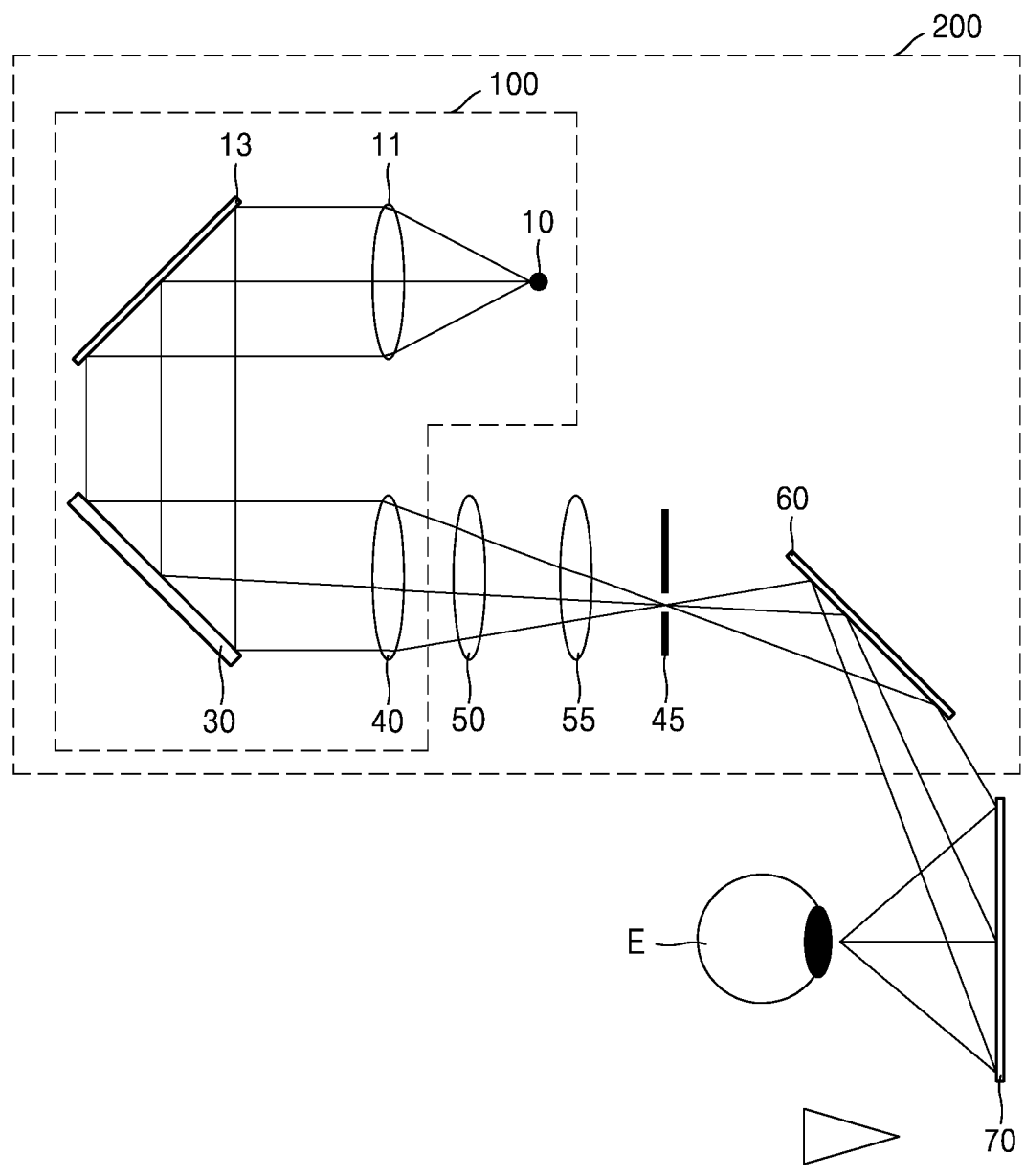
FIG. 2 schematically illustrates an example of a display apparatus to which an anamorphic optical system according to an example embodiment is applied.
Figure 2:
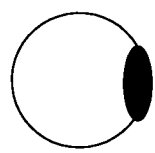

FIG. 2 schematically illustrates a display apparatus to which the anamorphic optical system according to the embodiment is applied. FIG. 2 illustrates an example of an optical configuration of the display apparatus to which the anamorphic optical system according to the example embodiment is applied, and the optical configuration of the display apparatus to which the anamorphic optical system according to the example embodiment is applied is not limited thereto and various modifications may be made.

Referring to FIG. 2, the display apparatus may include an anamorphic optical system 200 and an off-axis optical coupler 70 to which image light is transmitted from the anamorphic optical system 200. In FIG. 2, "E" represents an eye of a user.

In the example embodiment, the anamorphic optical system 200 includes an illumination system 100 that transmits image light and includes astigmatism, and first and second correction lenses 50 and 55 that have tangential power and sagittal power respectively and correct the astigmatism in the illumination system 100.

The illumination system 100 may include a light source 10 that provides light, a spatial light modulator 30 that reflects and modulates the light provided from the light source 10 to form an image, a focusing lens 40 that focuses light (hereinafter, referred to as image light) including image information generated by the spatial light modulator 30, and a filtering member 45 that is disposed to block image light of zero-order diffraction for an image formed by the spatial light modulator 30 and to make image light of a predetermined diffraction order pass therethrough and that transmits image light on an off-axis. The illumination system 100 may further include a collimating lens 11 for collimating the light emitted from the light source 10, a mirror member 13 for changing a travel path of the collimated light, and the like.

FIG. 2 illustrates an example of a case in which a single lens is provided as the focusing lens 40, and the focusing lens 40 may be configured by a plurality of lens units. In addition, FIG. 2 illustrates an example of a case in which one collimating lens 11 is applied to collimate the light emitted from the light source 10, and a plurality of collimating lenses may also be applied to collimate the light emitted from the light source 10. In addition, a structure without the mirror member 13 may be provided.

The spatial light modulator 30 may form an image by modulating incident light based on an image signal provided from a signal processor (not illustrated). The spatial light modulator 30 may include a reflective spatial light modulator. The spatial light modulator 30 may include, for example, a liquid crystal on silicon (LCoS) panel, a digital light projection (DLP) panel, or a digital micromirror device (DMD) panel. The spatial light modulator 30 may form an image in a manner that changes reflectivity according to a position on a surface of the spatial light modulator 30.

In the example embodiment, the spatial light modulator 30 may generate a hologram image. The hologram image generated by the spatial light modulator 30 is diffracted into zero-order image light, +1-order image light, −1-order image light, and so on by a pattern structure and so on of the spatial light modulator 30. In the example embodiment, the display apparatus may be configured to perform DC filtering to display the hologram image. That is, the filtering member 45 performs DC filtering by blocking the image light of the zero-order diffraction for an image formed by the spatial light modulator 30 and by making only image light of a predetermined diffraction order, for example, −1-order diffraction, pass therethrough.

To this end, the filtering member 45 shifts an aperture through which light passes from an optical axis to be located on the off-axis and thus enable DC filtering by blocking zero-order-diffracted light, image light of a predetermined diffraction order, for example, −1-order diffraction order, is used as effective light through a pupil of the filtering member 45, and the remaining light is blocked by the filtering member 45.

Accordingly, the illumination system 100 of the anamorphic optical system 200 in the display apparatus according to the example embodiment transmits the image light on the off-axis to the off-axis optical coupler 70, and thus, the image light may include astigmatism.

In the example embodiment, the first and second correction lenses 50 and 55 for correcting the astigmatism in the image light on the off-axis may be disposed between, for example, the focusing lens 40 and the filtering member 45. As another example, the first lens of the first and second correction lenses 50 and 55, for example, the first correction lens 50 may be disposed before the focusing lens 40 and may also be disposed before at least one of the plurality of lenses when the focusing lens 40 is configured by a plurality of lenses.

Astigmatism of image light is corrected by the first and second correction lenses 50 and 55, and thus, a tangential image and a sagittal image may be formed on the same image surface and may be focused at a pupil position of the filtering member 45.

As described above, in order to correct the astigmatism, a difference between a distance from the first correction lens 50 to the tangential image formed by the first correction lens 50 and a distance from the second correction lens 55 to the sagittal image formed by the second correction lens 55 may correspond to a distance between the first correction lens 50 and the second correction lens 55, and at least one of the first correction lens 50 and the second correction lens 55 may have an asymmetric stop to form the tangential image and the sagittal image on the same surface.

Accordingly, the astigmatism of the image light may be corrected by the first and second correction lenses 50 and 55, and thus, the tangential image and the sagittal image may be formed at an aperture position of the filtering member 45, and because a tangential stop position is the same as a sagittal stop position, light loss in the stop may be reduced, and thus, light efficiency may be increased. The image light passing through the aperture of the filtering member 45 may be reflected by the mirror member 60 to be incident on the optical coupler 70.

As illustrated in FIG. 2, by disposing the mirror member 60, the anamorphic optical system 200 that generates image light may be disposed, for example, next to the head of a user and may be incident on the optical coupler 70 located in front of the eye E of a user by reflecting the image light from the mirror member 60. The anamorphic optical system 200 and the mirror member 60 may configure a projection portion of the display apparatus.

The optical coupler 70 may focus and reflect incident image light on the off-axis to be sensed by the pupil of the eye E of the user.

The optical coupler 70 may be an off-axis optical coupler that reflects and focuses the incident image light on the off-axis. The optical coupler 70 may couple an image generated by the spatial light modulator 30 to an external image, such as a real image, and provide the coupled image to the pupil of the user. That is, the optical coupler 70 may couple a virtual image to a real image and provide the coupled image to the user. The optical coupler 70 may include a holographic optical element or a semi-transmissive mirror.

The optical coupler 70 may include, for example, a holographic optical element (HOE) in which a volume hologram is recorded on an off-axis. In the example embodiment, the off-axis HOE optical coupler 70 may be formed to focus and reflect light incident on the off-axis.

As another example, the optical coupler 70 may also include a semi-transmissive mirror that focuses and reflects incident light on the off-axis and transmits light of a real image to proceed to the pupil of the user.

As described above, the optical coupler 70 may provide light of a virtual image to the user and transmit light of a real image from the outside to proceed to the pupil of the user at the same time. As described above, the optical coupler 70 may couple a virtual image with a real image and provide the coupled image to the user.

As described above, by coupling the virtual image and the real image by using the optical coupler 70 and providing the coupled image to a user, the display apparatus according to the example embodiment may be implemented as an augmented reality display apparatus or a mixed reality display apparatus, and may be implemented as a glasses type, a head-mounted type, a goggles type, a head-up type, and so on.

As another example, by configuring the optical coupler 70 to focus and reflect incident light on the off-axis, the display apparatus according to the example embodiment may be implemented as a virtual reality display apparatus, and may also be implemented as a glasses type, a head-mounted type, a goggles type, a head-up type, and so on in this case.

The display apparatus of FIG. 2 may have a structure in which a projection portion is disposed next to the head of a user, and for example, a structure in which the projection portion is disposed on a temple when implemented as a glasses type, and embodiments are not limited thereto.

Figure 3:
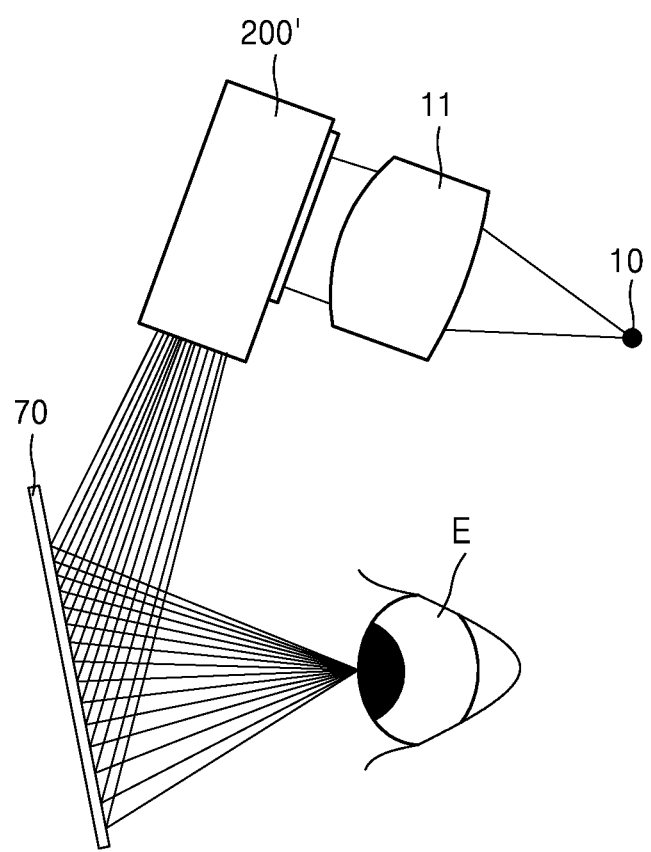
FIG. 3 schematically illustrates another example of a display apparatus to which an anamorphic optical system according to an example embodiment is applied.

For example, in the display apparatus according to an example embodiment illustrated in FIG. 3, the projection portion may be disposed on a forehead side of a user. In FIG. 3, an optical system 200' may include an optical configuration excluding the light source 10 and the collimating lens 11 in the projection portion of FIG. 2. For example, the display apparatus of FIG. 3 may have the same optical configuration as in FIG. 2, and the optical system 200' may include the mirror member 13, the spatial light modulator 30, the focusing lens 40, the first and second correction lenses 50 and 55, the filtering member 45, the mirror member 60, and so on.

The projection portion of the display apparatus in FIGS. 2 and 3 may include, for example, a mirror member 60 that reflects off-axis image light, which passes through the pupils, of the anamorphic optical system 200 and the filtering member 45 of the anamorphic optical system 200 to be incident on the optical coupler 70.

As described above, the display apparatus according to the example embodiment includes the first and second correction lenses 50 and 55 to correct astigmatism in image light, thereby, enabling a tangential stop position to be the same as a sagittal stop position, and thus, light loss at the stop may be reduced, resulting in an increase in light efficiency.

As such, an example embodiment in which an anamorphic optical system according to an example embodiment is applied to a display apparatus is described as an example, and the anamorphic optical system according to the example embodiment is not limited thereto, and the anamorphic optical system according to the embodiment may be applied to correct the astigmatism in any optical system including astigmatism.

For example, in an anamorphic optical system, an illumination system may include an optical element that emits light with astigmatism, and first and second correction lenses may be disposed to correct the astigmatism of the light emitted from the optical element. In this case, the optical element may include various optical elements such as a semiconductor laser, a light emitting element, and a waveguide.

Hereinafter, a principle of correcting astigmatism by using first and second cylindrical lenses when an amorphous optical system according to an example embodiment is applied to a display apparatus including an off-axis HOE optical coupler, will be described.

Figure 4:
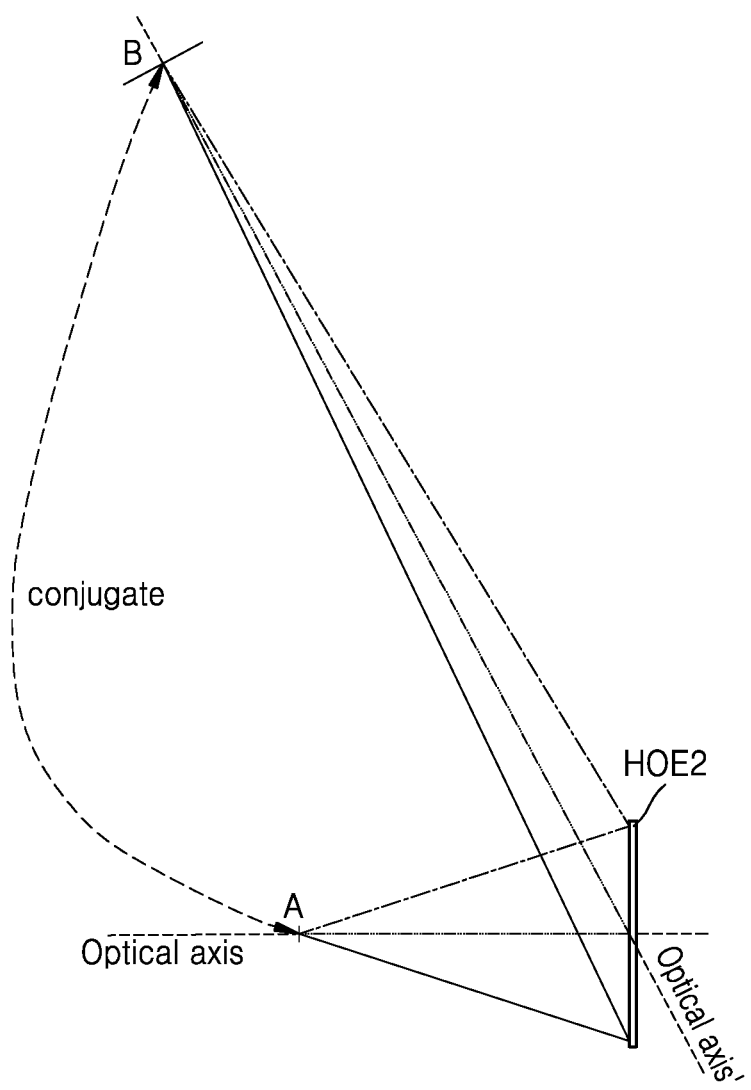
FIG. 4 illustrates an example in which a volume hologram of a point-to-point type in which a point A and a point B are conjugated is recorded.

As illustrated in FIG. 4, in a display apparatus that uses an off-axis HOE optical coupler and transmits an image on an off-axis, the off-axis HOE may record a volume hologram.

Figure 5:
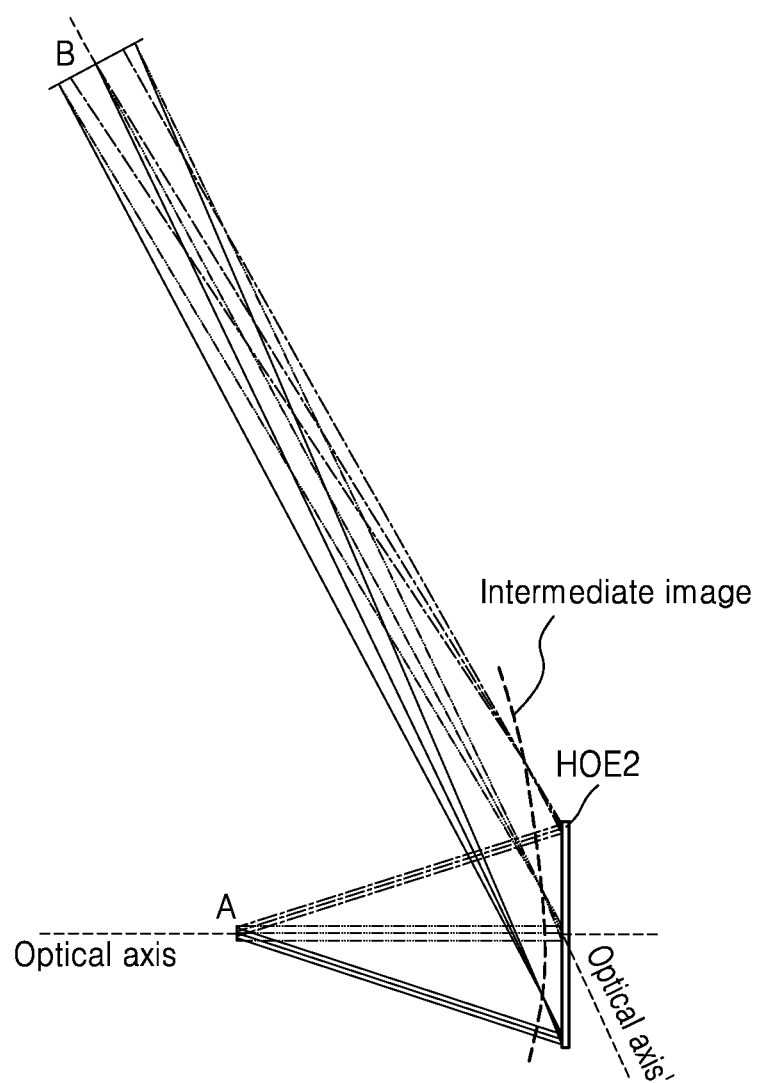
FIG. 5 illustrates that an intermediate image is formed when a light beam is incident with a size in order to use an off-axis holographic optical element (HOE) having a volume hologram of FIG. 4 recorded on an off-axis as an optical coupler.
Figure 6:
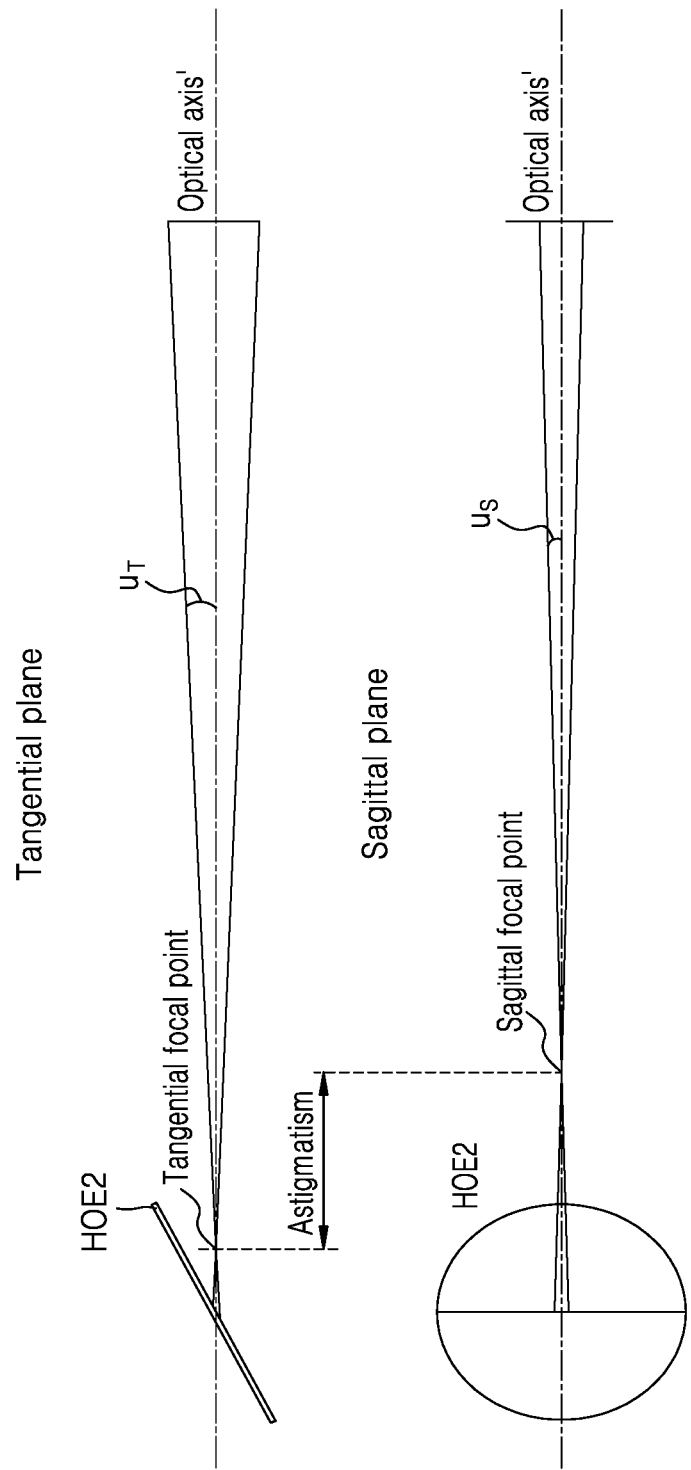
FIG. 6 illustrates 0° field astigmatism appearing on a new optical axis of an intermediate image formed when a light beam is incident with a size in order to use an off-axis HOE having a volume hologram of FIG. 4 recorded on an off-axis as an optical coupler.

FIG. 4 illustrates an example in which a volume hologram of a point-to-point type in which point A and point B are conjugated is recorded. In order to use the off-axis HOE HOE2 in which the volume hologram is recorded on the off-axis as illustrated in FIG. 4 as an optical coupler, when a light beam having a size as illustrated in FIG. 5 is incident, an intermediate image may be formed. In this case, 0° field astigmatism in a new optical axis appears in the intermediate image as illustrated in FIG. 6. Also, as illustrated in FIG. 6, the divergence angles $U_T$ in the tangential plane and $U_S$ in the sagittal plane of the intermediate image are different from each other.

Figure 7:
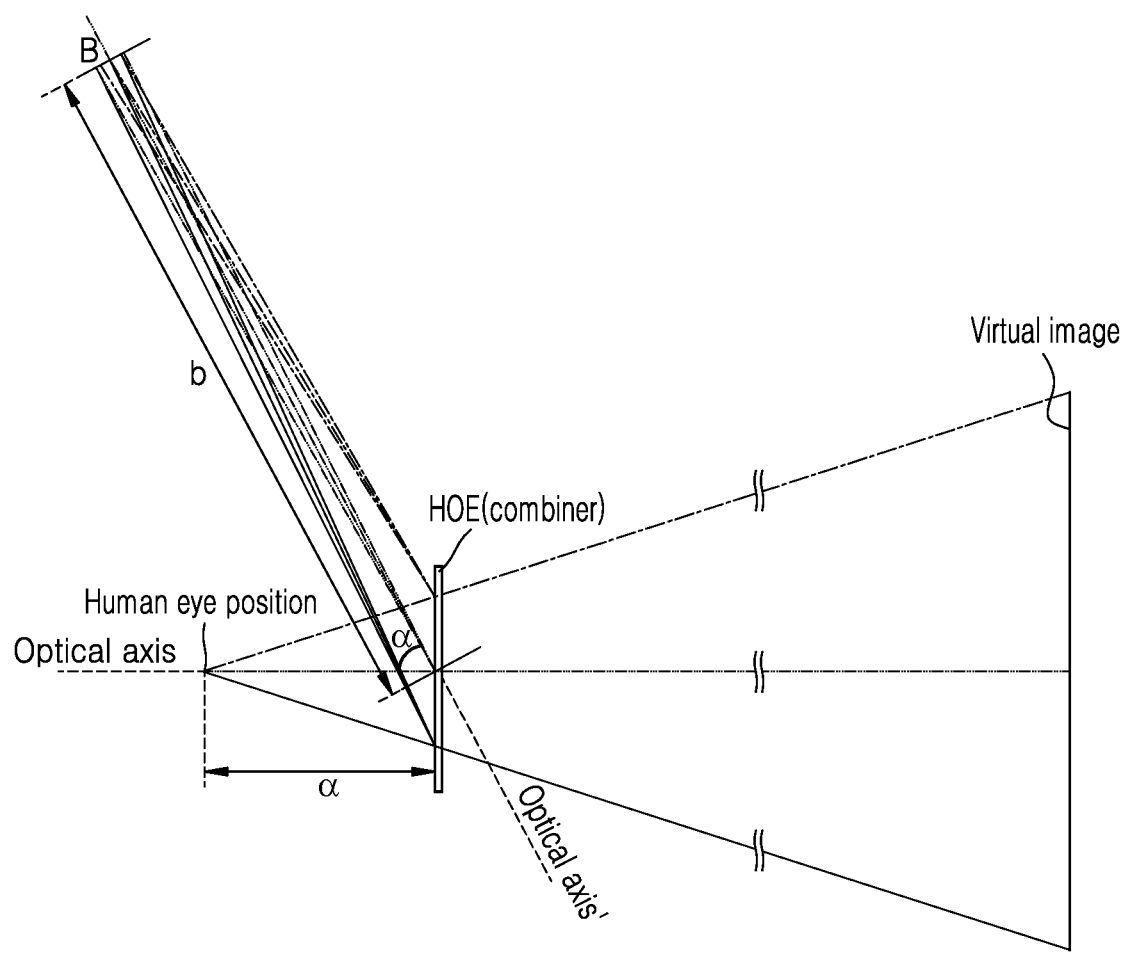
FIG. 7 illustrates a schematic diagram of an HOE optical coupler for a glasses-type display apparatus.
Figure 8A:
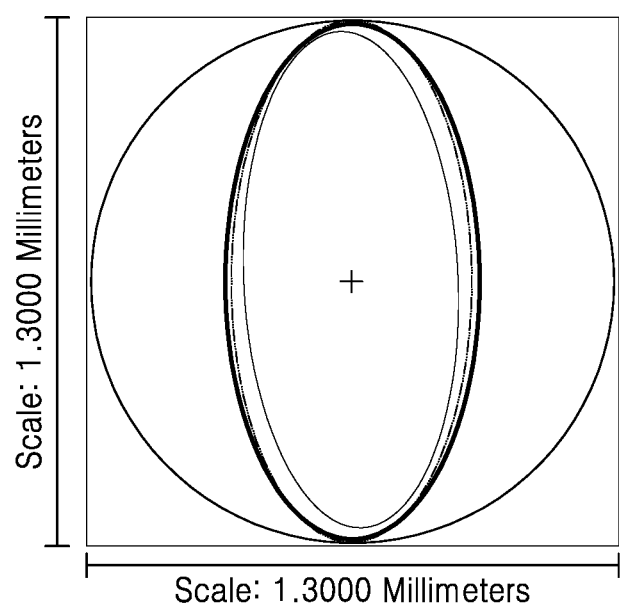
FIGS. 8A and 8B illustrate a footprint diagram and a 0° field astigmatism of an aperture stop of FIG. 7.
Figure 8B:
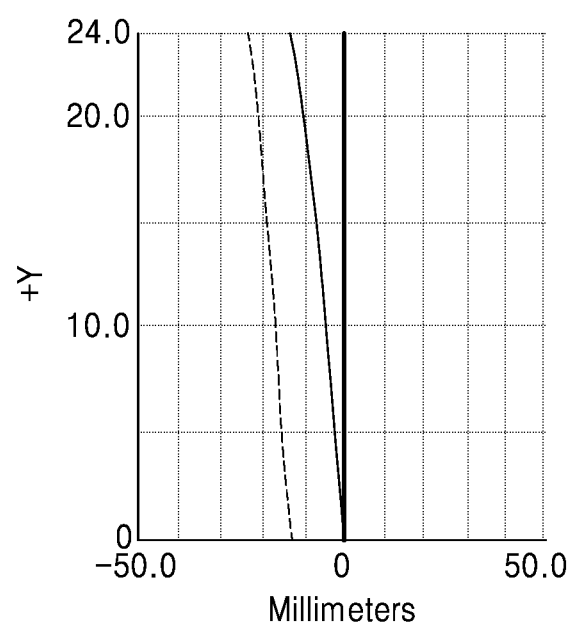

In addition, because divergence angles $U_T$ and $U_S$ of the intermediate image are different from each other, when the off-axis HOE is applied to an optical coupler for a glasses-type display apparatus as illustrated in FIG. 7, an aperture stop is formed anamorphically as illustrated in FIGS. 8A and 8B. FIG. 8A illustrates a footprint diagram in the aperture stop of FIG. 7, and FIG. 8B illustrates 0° field astigmatism. FIG. 7 illustrates a schematic diagram of an HOE optical coupler for a glasses-type display apparatus, in which, a (eye relief) may be in a range of 20 mm<a<30 mm considering the glasses-type display apparatus, and b may be in a range of 60 mm<b<80 mm and a may be in a range of 60°<α<80° considering a structure of the face.

When a target to be corrected is an object with astigmatism like the off-axis HOE or the intermediate image, optical aberration obtained by adjusting a position and a size of a stop may not be controlled because a tangential stop position and a sagittal stop position are different from each other. Even though the stop positions are the same, if sizes (a numerical aperture (NA) of an object and a divergence angle of an object or an intermediate image) of the tangential stop and the sagittal stop are different, values of the numerical values on an image surface may also be different from each other, resulting in a difference in resolution between the tangential stop and the sagittal stop. Accordingly, in order to form an image of an object (or an intermediate image) with astigmatism on an on-axis, conditions of astigmatism correction of the object, position matching of the stop, and rotationally symmetric stop have to be satisfied.

An anamorphic optical system according to an example embodiment may configure an anamorphic optical system including a rotationally symmetric aperture stop that corrects astigmatism of an object (or an intermediate image of an optical system) with the astigmatism on the on-axis and a display apparatus using the same.

Equation 1 represents the Lens maker's equation.

$$-\frac{1}{s} + \frac{1}{s'} = \frac{1}{f}$$ [Equation 1]

According to the Lens maker's equation, light emitted from an object spaced apart by s from a lens with a focal length f is imaged in s'. The astigmatism means that a tangential focal plane and a sagittal focal plane are formed differently.

Astigmatism may exist in which a tangential object $OBJ_T$ and a sagittal object $OBJ_S$ are separated, and there may be cases in which divergence angle of respective objects are different. In addition, the tangential stop position and the sagittal stop position may also be different. When the tangential object and the sagittal object satisfy Condition 1 and Condition 2 of the following Equation 2, and additionally pass through the first and second cylindrical lenses configured to satisfy Condition 3, positions of the tangential image and the sagittal image may be the same, positions of respective stops may also be the same, and in addition, divergence angles thereof may be the same.

[Equation 2]

Figure 9:
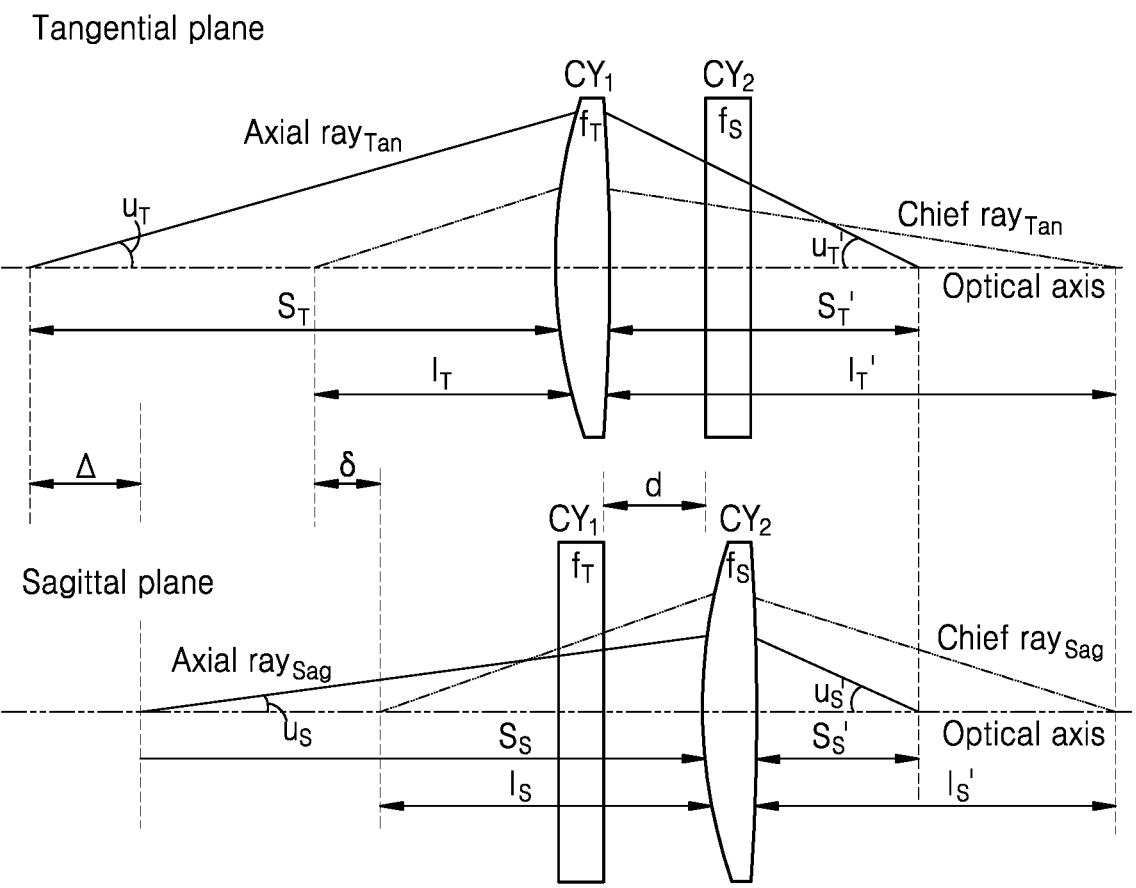
FIG. 9 illustrates a schematic diagram for correction of an object having astigmatism and an asymmetric stop.

$S'_S = S'_T - d$      Condition 1:

$l'_S = l'_T - d$      Condition 2:

$u'_T = u'_S$      Condition 3:

FIG. 9 illustrates a schematic diagram of correction of an object having astigmatism and asymmetric stops. In FIG. 9, $CY_1$ indicates a first cylindrical lens corresponding to one of the first correction lens 3 (in FIG. 1) or 50 (in FIG. 2) and the second correction lens 5 (FIG. 1) or 55 (in FIG. 2) in the anamorphic optical system according to the example embodiment, and $CY_2$ indicates a second cylindrical lens corresponding to the other of the first correction lens 3 or 50 and the second correction lens 5 or 55.

Referring to FIG. 9, when a target is located on the right of a reference point, a plus sign is used, and when the target is located on the left thereof, a minus sign is used, and when an acute angle of a divergence angle of a light beam is in a counterclockwise direction of an optical axis, a plus sign is used, and when the acute angle thereof is in a clockwise direction, a minus sign is used.

In FIG. 9, $f_T$ represents a tangential focal length of $CY_1$, $f_S$ represents a sagittal focal length of $CY_2$, $S_T$ represents a distance from $CY_1$ to a tangential object, $S_T'$ represents a distance from $CY_1$ to a tangential image, $I_T$ represents a distance from $CY_1$ to a tangential first stop, $I_T'$ represents a distance from $CY_1$ to a tangential second stop, $S_S$ represents a distance from $CY_2$ to a sagittal object, $S_S'$ represents a distance from $CY_2$ to a sagittal image, $I_S$ represents a distance from $CY_2$ to a sagittal first stop, $I_S'$ represents a distance from $CY_2$ to a sagittal second stop, $u_T$ represents a divergence angle of the tangential object, $u_T'$ represents a divergence angle of the tangential image, $u_S$ represents a divergence angle of the sagittal object, $u_S'$ represents a divergence angle of the sagittal image, $\Delta$ represents a distance from the tangential object to the sagittal object, $\delta$ represents a distance from the tangential first stop to the sagittal first stop, and d represents a distance from $CY_1$ to $CY_2$.

When equations for $f_T$ and $f_S$ satisfying Condition 1 of Equation 2 are obtained by using the lens maker's equation of Equation 1, Equation 3 is obtained as follows.

$[(S_T-d)^2 + \Delta(S_T-d)]f_S - S_T(S_T+\Delta)f_S - \Delta f_T f_S - d S_T(S_T-d+\Delta) = 0$      [Equation 3]

When equations for $f_T$ and d satisfying Condition 3 of Equation 2 are obtained by using the lens maker's equation of Equation 1, Equation 4 is obtained as follows.

$$d = \frac{\alpha f_T}{\beta + \gamma f_T}$$ [Equation 4]

In this case, $\alpha=(S_T+\Delta)\tan U_s+S_T \tan U_T$, $\beta=S_T \tan U_T$, $\gamma=\tan U_T+\tan U_s$.

In addition, equations for $f_T$ and $f_S$ satisfying Condition 2 may be obtained by substituting $S_T$ with $I_T$ and $\Delta$ with $\delta$ in Equation 3.

Accordingly, when information ($\Delta$, $\delta$, $U_T$, and $U_S$) of an object to be corrected is known, values of $f_T$, $f_S$, and d may be obtained with respect to $S_T$. An object passing through an optical system satisfying the condition may form images of a tangential image and a sagittal image at the same position and may form stops having the same position and size. The stop positions may be fixed by forming the stops to satisfy only Condition 1 and Condition 2, and a shape of the stop may be formed in a shape that is not rotationally symmetric, for example, an oval shape.

Figure 10:
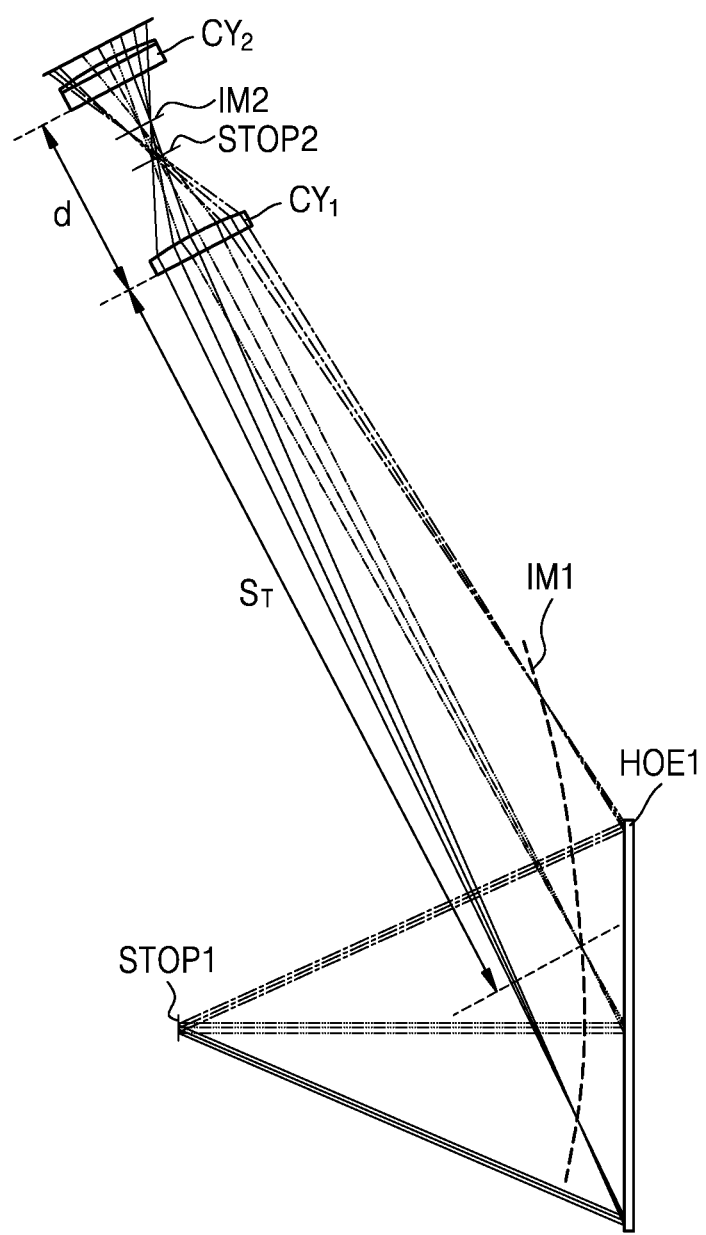
FIG. 10 illustrates an example in which on-axis astigmatism is removed and a circularly symmetric stop is formed by applying an anamorphic optical system according to an example embodiment to an off-axis HOE optical coupler HOE1 for a glasses-type display apparatus.

FIG. 10 illustrates an example in which an anamorphic optical system according to an embodiment is applied to an off-axis HOE optical coupler HOE1 for a glasses-type display apparatus to remove on-axis astigmatism and form a circular symmetric stop. Due to characteristics of the glasses-type display apparatus, a form factor has to be minimized and the display apparatus has to be folded according to a facial structure, and thus, for example, the display apparatus may be limited to, for example, 40<$S_T$<70 mm and d<10 mm. $S_T$ represents the distance from the first cylindrical lens CY1 to the tangential object, and d represents the distance between the first cylindrical lens CY1 and the second cylindrical lens CY2. Here, the first cylindrical lens CY1 and the second cylindrical lens CY2 are orthogonal to each other, and when the first cylindrical lens CY1 has tangential power, the second cylindrical lens CY2 has sagittal power, and when the first cylindrical lens CY1 has sagittal power, the second cylindrical lens CY2 has tangential power. In FIG. 10, IM1 represents a tangential first intermediate image position, IM2 represents a virtual second intermediate image position, STOP1 represents a first stop position, and STOP2 represents a virtual second stop position.

Figure 11A:
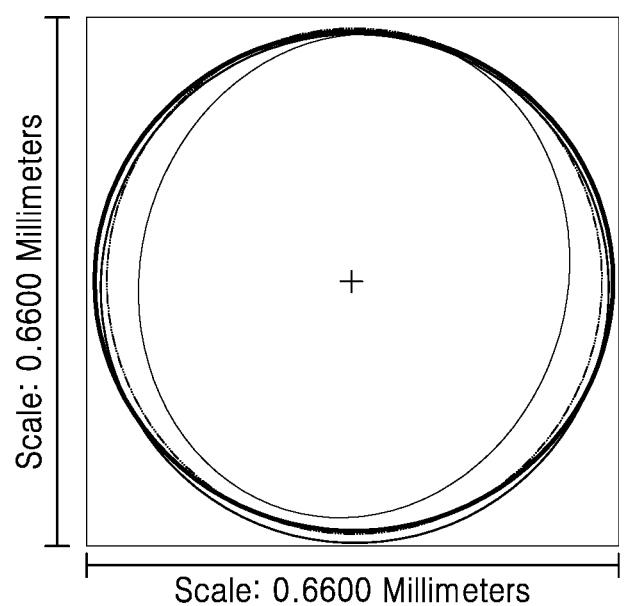
FIG. 11A illustrates a footprint diagram at STOP2 of a system corrected to remove on-axis astigmatism.
Figure 11B:
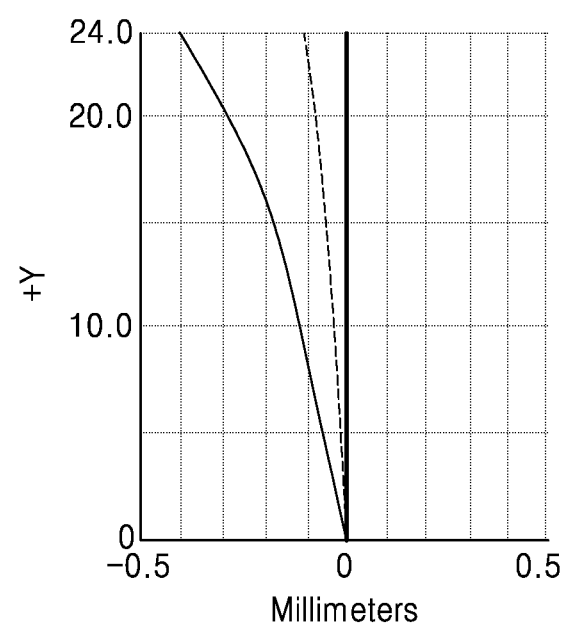
FIG. 11B illustrates removed 0° field astigmatism in a system corrected to remove on-axis astigmatism.

When on-axis astigmatism is removed by the first cylindrical lens CY1 and the second cylindrical lens CY2 as illustrated in FIG. 10, an aperture stop in STOP2 may be formed in a circularly symmetric manner as in FIGS. 11A and 11B. FIG. 11A illustrates a footprint diagram in STOP2 of a system corrected to remove on-axis astigmatism, and FIG. 11B illustrates removed 0° field astigmatism in the system corrected to remove the on-axis astigmatism.

Figure 12A:
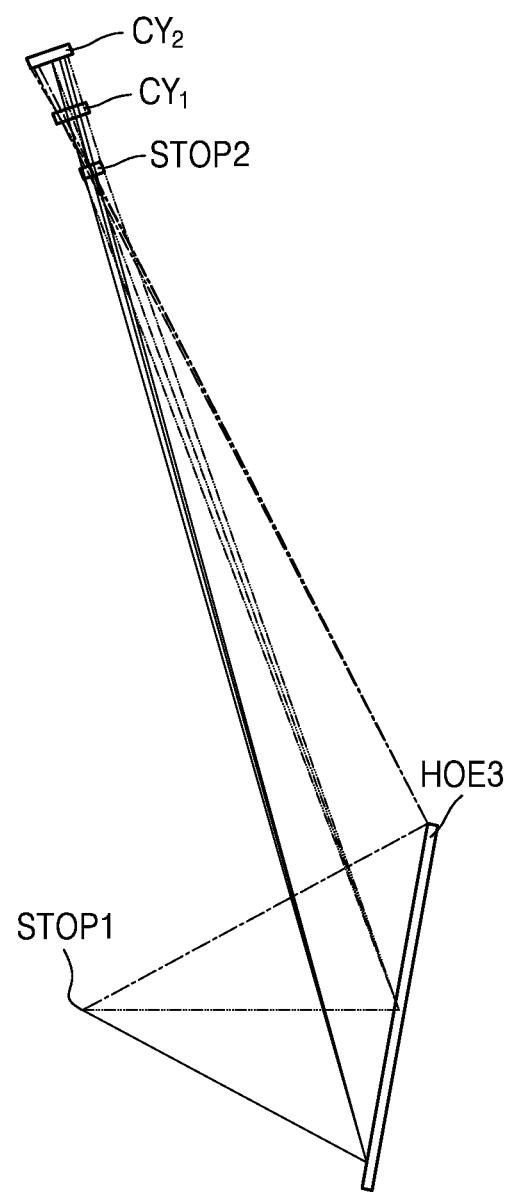
FIG. 12A illustrates a schematic diagram for correction of astigmatism and a stop of an off-axis HOE HOE3 having optical power.
Figure 12B:
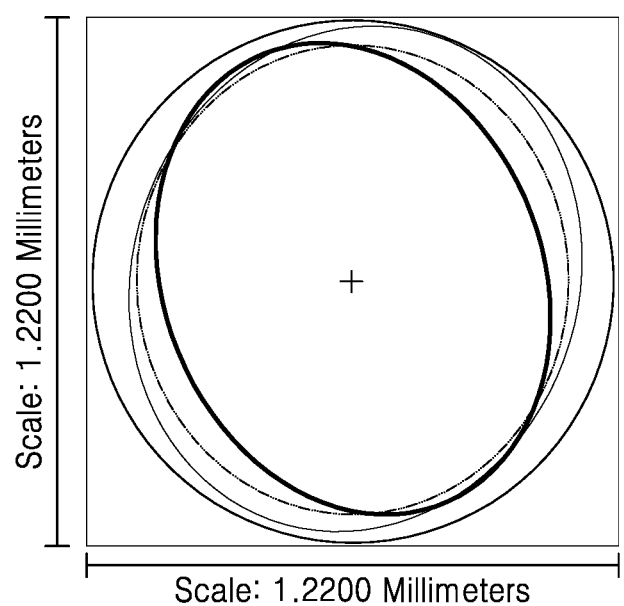
FIG. 12B illustrates a footprint diagram at a stop position of FIG. 12A.

FIG. 12A is a schematic diagram of correction of astigmatism and a stop of an off-axis HOE HOE3 having optical power, and FIG. 12B illustrates a footprint diagram at a stop position of FIG. 12A.

As illustrated in FIGS. 12A and 12B, by using an off-axis HOE HOE3 optical coupler having optical power, when the second stop position STOP2 is placed between the first cylindrical lens $CY_1$ and the off-axis HOE HOE3, an anamorphic stop according to astigmatism and a field may be formed in a newly defined optical axis. Even in this case, astigmatism may be corrected and a symmetrical stop may be formed by the first cylindrical lens $CY_1$ and the second cylindrical lens $CY_2$.

When an anamorphic optical system according to fan embodiment described above is applied to a display apparatus including an off-axis HOE optical coupler, the display apparatus may implement a virtual reality system, an augmented reality system, and a mixed reality system in a glasses type, a head-mounted type, a goggles type, or a head-up type.

According to the disclosure, an example embodiment is described in which astigmatism is corrected by first and second cylindrical lenses when the anamorphic optical system according to the embodiment is applied to the display apparatus including the off-axis HOE optical coupler, and the display apparatus to which the anamorphic optical system according to the embodiment is applied may also use a mirror having a curvature on an off-axis instead of the off-axis HOE optical coupler.

Figure 13A:
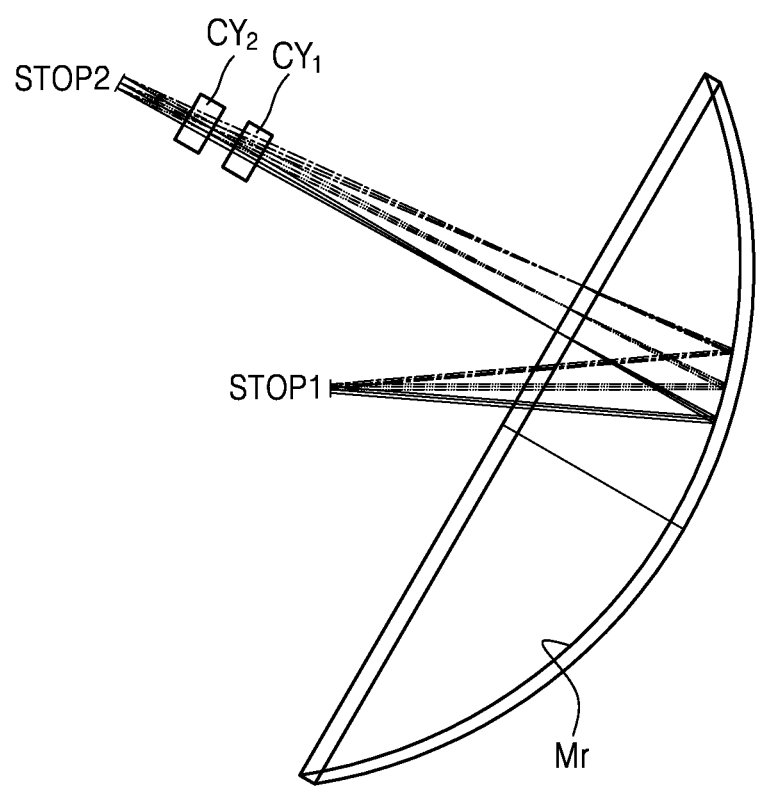
FIG. 13A illustrates a schematic diagram relating to correction of astigmatism and a stop of an off-axis mirror.
Figure 13B:
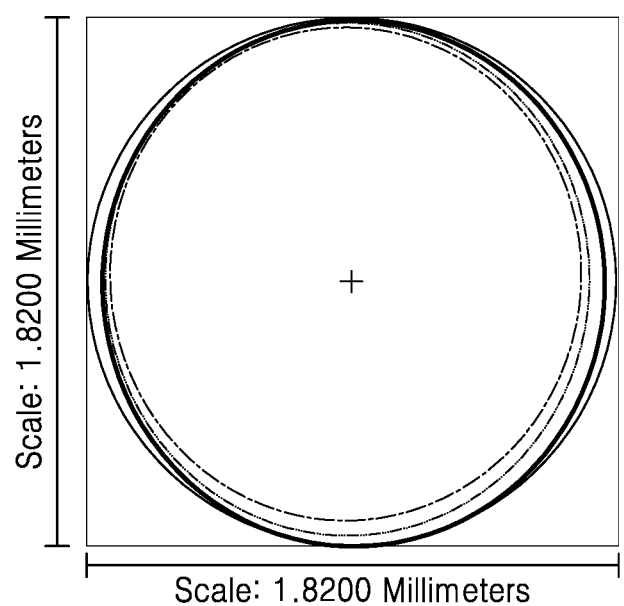
FIG. 13B illustrates a footprint diagram at a stop position of FIG. 13A.

That is, even when the mirror having a curvature is used on the off-axis as illustrated in FIGS. 13A and 13B, astigmatism is corrected and a symmetrical stop may be formed by the first cylindrical lens $CY_1$ and the second cylindrical lens $CY_2$.

FIG. 13A illustrates a schematic diagram of correction of astigmatism and a stop of the off-axis mirror, and FIG. 13B illustrates a footprint diagram at the stop position of FIG. 13A.

As illustrated in FIGS. 13A and 13B, when a mirror having a curvature is used on an off-axis, a change occurs in an optical axis, and astigmatism and an anamorphic stop may formed by the mirror in a newly defined optical axis. Even in this case, astigmatism may be corrected and a symmetrical stop may be formed by the first cylindrical lens $CY_1$ and the second cylindrical lens $CY_2$. Here, the off-axis mirror of FIG. 13A may be, for example, a reflective mirror or a transflective mirror.

When a display apparatus to which an anamorphic optical system according to the embodiment described above is applied uses a mirror having a curvature on an off-axis, the display apparatus may implement a virtual reality system, an augmented reality system, or a mixed reality system in a glasses type, a head-mounted type, a goggles type, or a head-up type, or may be implemented as an illumination device.

In the above, a case in which an anamorphic optical system according to an embodiment is applied to a display apparatus is described as an example, and an illumination system of the anamorphic optical system according to the embodiment may include an optical device that emits light with astigmatism as described above, and the astigmatism may be corrected by first and second correction lenses, for example, first and second cylindrical lenses.

That is, the anamorphic optical system according to the embodiment may be applied to an optical device in which astigmatism occurs in a light source itself such as astigmatism may be corrected.

According to another example embodiment, two or more cylindrical lenses may be used to collimate light emitted from a semiconductor laser so that a tangential focal point and a sagittal focal point coincide with each other and to configure a symmetrical illumination region.

Figure 14:
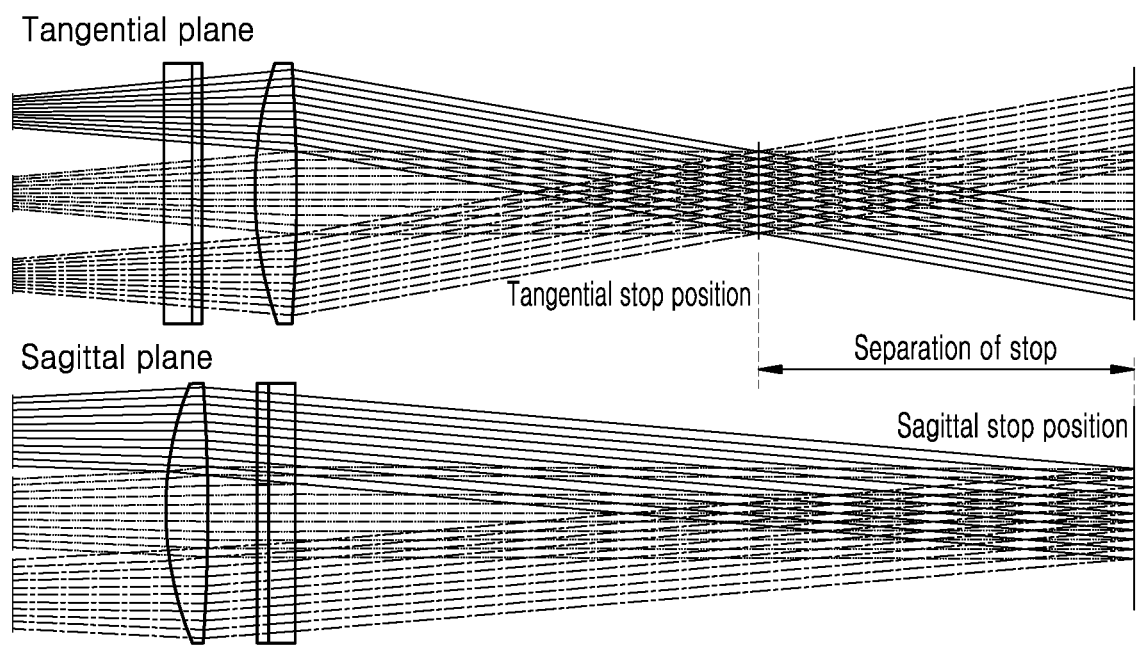
FIG. 14 illustrates a schematic diagram of collimation when semiconductor lasers are arranged in a rectangular array.

However, in a case in which an object having a field is configured by using multiple semiconductor lasers, when collimation is made in a known manner, a tangential stop position and a sagittal stop position are separated as illustrated in FIG. 14.

FIG. 14 is a schematic diagram of the collimation when the semiconductor lasers are arranged in a rectangular array.

As can be seen in FIG. 14, when semiconductor lasers are arranged in a rectangle to increase the amount of light, each semiconductor laser may be collimated, but illustrates that a stop position (illumination region) is separated. When either the tangential stop or the sagittal stop is used as the illumination region, light loss may occur.

Figure 15A:
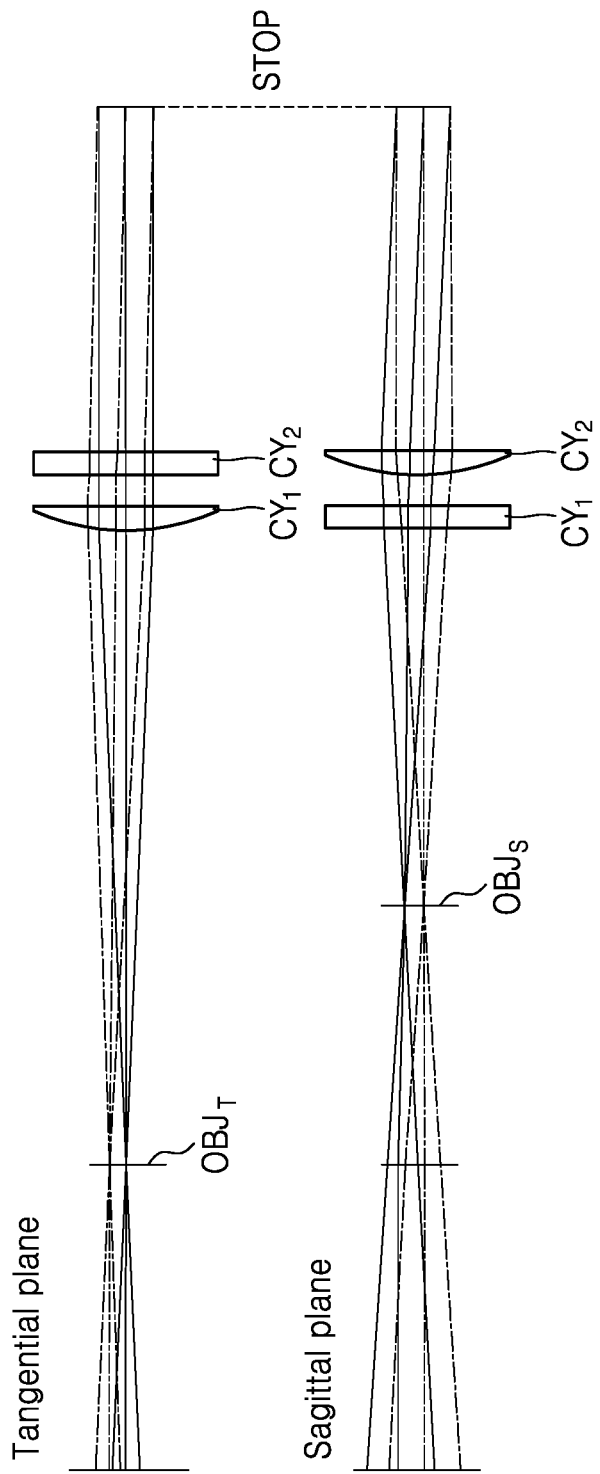
FIG. 15A illustrates a schematic diagram of semiconductor laser collimating illumination.
Figure 15B:
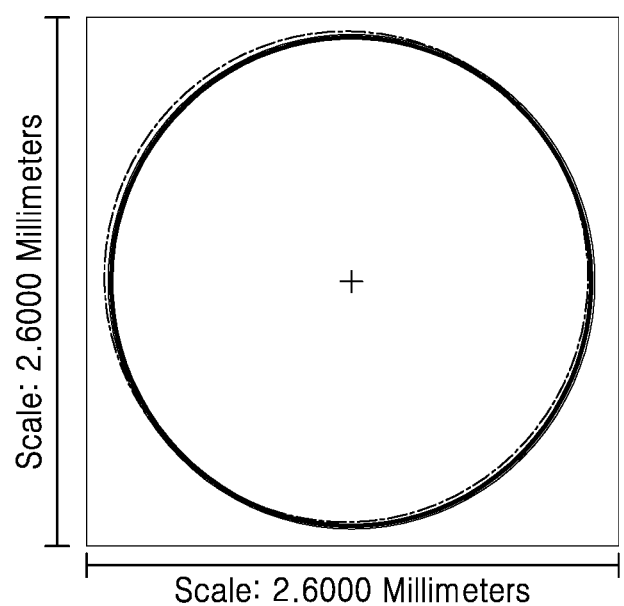
FIG. 15B illustrates a footprint diagram at a stop position of semiconductor laser collimating illumination.

However, when a principle of the anamorphic optical system according to the example embodiment is applied, astigmatism may be corrected and a circularly symmetrical illumination region may be formed by the first cylindrical lens $CY_1$ and the second lens $CY_2$ as can be seen in FIGS. 15A and 15B, even when illumination is made by using two or more semiconductor lasers. FIG. 15A is a schematic diagram of semiconductor laser collimating illumination in a tangential plane and sagittal plane. FIG. 15B is a footprint diagram at a stop position of the semiconductor laser collimating illumination.

An apparatus to which the anamorphic optical system according to the example embodiment described above is applied may be implemented as a glasses-type display apparatus, a head-mounted type display apparatus, a goggles-type display apparatus, or a head-up display apparatus for a virtual reality system, an augmented reality system, or a mixed reality system, and may also be implemented as an illumination device.

Figure 16:
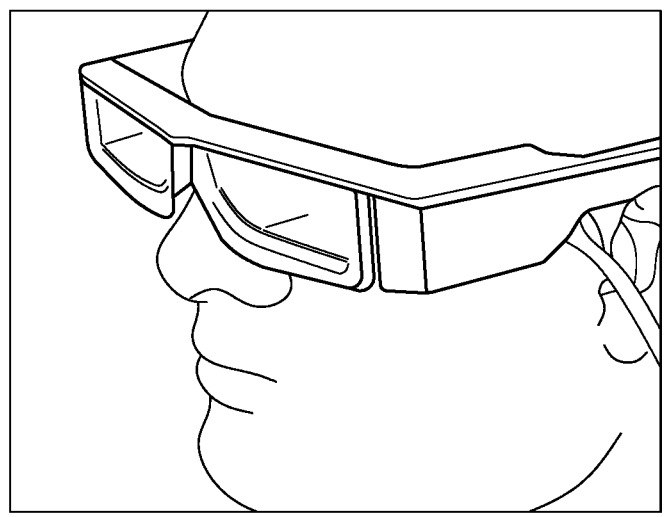
FIGS. 16 to 18 illustrate various electronic devices to which a display apparatus according to an example embodiment is applicable.
Figure 17:
Figure 18:
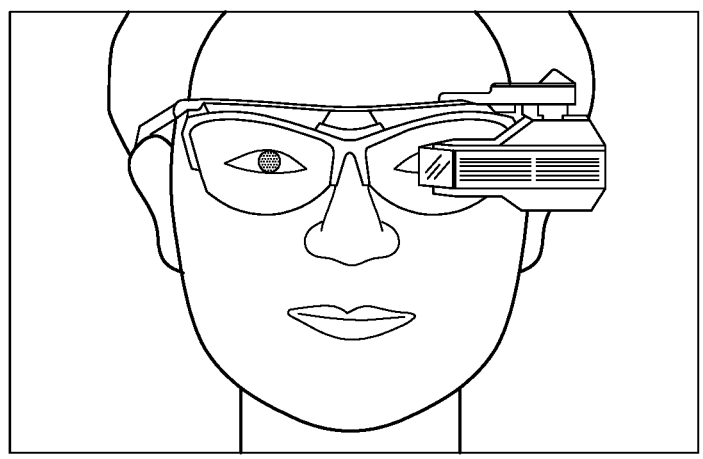

FIGS. 16 to 18 illustrate various electronic devices to which the display apparatuses according to the example embodiments described above may be applied. As illustrated in FIGS. 16 to 18, the display apparatus may configure a wearable device. In other words, the display apparatus may be applied to the wearable device. For example, the display apparatus may be applied to a glasses-type display. In addition, the display apparatus may be applied to a head-mounted display (HMD), a goggles-type display, and so on. The wearable electronic devices illustrated in FIGS. 16 to 18 may be operated in conjunction with a smart phone or a mobile device. The display apparatus may include a virtual reality (VR) display apparatus, an augmented reality (AR) display apparatus, or a mixed reality (MR) display apparatus, which may provide VR or provide a virtual image and an external real landscape together, of a head-mounted type, a glasses type, a goggles type, or a head-up type.

In addition, the display apparatus may be provided in a smart phone or a mobile device, and the smart phone or the mobile device itself may be used as a VR display apparatus, an AR display apparatus, or an MR display apparatus. In other words, the display apparatus may be applied as a display apparatus in a small electronic device (mobile electronic device) other than the wearable device illustrated in FIGS. 16 to 18. In addition, an application field of the display apparatus may be changed in various ways. For example, the display apparatus may be applied to VR, AR, or MR, and may also be applied to other fields. For example, the display apparatus may also be applied to a small television, a small monitor, or so on that may be worn by a user.

According to an anamorphic optical system and a display apparatus including the same according the example embodiment, astigmatism in image light may be corrected and an aperture stop may be controlled by making a tangential stop position be the same as a sagittal stop position.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A display apparatus comprising:
   an anamorphic optical system which includes an illumination system configured to transmit image light and having astigmatism, the anamorphic optical system further includes a first correction lens configured to have tangential power and a second correction lens configured to have sagittal power; and
   an off-axis optical coupler to which the image light from the anamorphic optical system is transmitted,
   wherein a difference between a first distance from the first correction lens to a tangential image formed by the first correction lens and a second distance from the second correction lens to a sagittal image formed by the second correction lens corresponds to a third distance between the first correction lens and the second correction lens,
   wherein at least one of the first correction lens and the second correction lens has an asymmetric stop to form the tangential image and the sagittal image directly on an aperture position of a filtering member so as to correct the astigmatism in the illumination system,
   wherein the filtering member is provided at an intermediate position in an optical pathway between the optical coupler and the first and second correction lenses, and
   wherein a tangential stop position of the first correction lens and a sagittal stop position of the second correction lens are at the aperture position of the filtering member.

2. The display apparatus of claim 1, wherein a first divergence angle of the tangential image formed by the first correction lens and a second divergence angle of the sagittal image formed by the second correction lens satisfy a same condition.

3. The display apparatus of claim 1, wherein the first and second correction lenses include cylindrical lenses orthogonal to each other.

4. The display apparatus of claim 1, wherein the illumination system is provided to transmit the image light on an off-axis.

5. The display apparatus of claim 1, wherein the illumination system includes:
   a light source configured to emit light;
   a spatial light modulator configured to generate an image by using the light;
   a focusing lens configured to focus the image generated by the spatial light modulator; and
   a filtering member configured to:
      block image light of zero-order diffraction for an image generated by a display panel;
      allow image light of a predetermined diffraction order to pass therethrough and transmit the image light on an off-axis.

6. The display apparatus of claim 5, wherein the spatial light modulator includes a reflective spatial light modulator is further configured to reflect light to generate an image.

7. The display apparatus of claim 5, wherein the spatial light modulator is further configured to generate a hologram image.

8. The display apparatus of claim 5, wherein the first and second correction lenses are disposed between the spatial light modulator and the filtering member.

9. The display apparatus of claim 5, wherein the optical coupler includes a holographic optical element or a transflective mirror.

10. The display apparatus of claim 5, wherein the optical coupler includes an off-axis holographic optical element.

11. The display apparatus of claim 5, wherein the display apparatus is a display apparatus of one of a glasses type, a head-mounted type, a goggles type, or a head-up type.

12. The display apparatus of claim 11, wherein the display apparatus is one of a virtual reality (VR) display apparatus, an augmented reality (AR) display apparatus, or a mixed reality (MR) display apparatus.

13. The display apparatus of claim 1, wherein the display apparatus is a display apparatus of one of a glasses type, a head-mounted type, a goggles type, or a head-up type.

14. The display apparatus of claim 13, wherein the display apparatus is one of a virtual reality (VR) display apparatus, an augmented reality (AR) display apparatus, or a mixed reality (MR) display apparatus.

15. An anamorphic optical system comprising:
an illumination system having astigmatism; and
a first correction lens configured to have tangential power;
a second correction lens configured to have sagittal power,
wherein a difference between a first distance from the first correction lens to a tangential image formed by the first correction lens and a second distance from the second correction lens to a sagittal image formed by the second correction lens corresponds to a third distance between the first correction lens and the second correction lens,
wherein at least one of the first correction lens and the second correction lens has an asymmetric stop to form the tangential image and the sagittal image directly on an aperture position of a filtering member so as to correct the astigmatism in the illumination system,
wherein the filtering member is provided at an intermediate position in an optical pathway between an optical coupler and the first and second correction lenses, and
wherein a tangential stop position of the first correction lens and a sagittal stop position of the second correction lens are at the aperture position of the filtering member.

16. The anamorphic optical system of claim 15, wherein a first divergence angle of the tangential image formed by the first correction lens and a second divergence angle of the sagittal image formed by the second correction lens satisfy a same condition.

17. The anamorphic optical system of claim 15, wherein the first and second correction lenses include cylindrical lenses orthogonal to each other.

18. The anamorphic optical system of claim 15, wherein the illumination system includes off-axis light.

19. A method of correcting astigmatism in an anamorphic optical system that includes an illumination system having astigmatism, the method comprising:
providing a first correction lens having tangential power;
providing a second correction lens having sagittal power,
wherein a difference between a first distance from the first correction lens to a tangential image formed by the first correction lens and a second distance from the second correction lens to a sagittal image formed by the second correction lens corresponds to a third distance between the first correction lens and the second correction lens,
wherein at least one of the first correction lens and the second correction lens has an asymmetric stop to form the tangential image and the sagittal image directly on an aperture position of a filtering member so as to correct the astigmatism in the illumination system,
wherein the filtering member is provided at an intermediate position in an optical pathway between an optical coupler and the first and second correction lenses, and
wherein a tangential stop position of the first correction lens and a sagittal stop position of the second correction lens are at the aperture position of the filtering member.

20. The method of claim 19, wherein a first divergence angle of the tangential image formed by the first correction lens and a second divergence angle of the sagittal image formed by the second correction lens satisfy a same condition.

* * * * *